(12) United States Patent
Niimoto et al.

(10) Patent No.: US 10,999,474 B2
(45) Date of Patent: May 4, 2021

(54) ELECTRONIC DEVICE, CONTROL METHOD OF ELECTRONIC DEVICE, INFORMATION PROCESSING SYSTEM, AND STORAGE MEDIUM

(71) Applicant: CANON KABUSHIKI KAISHA, Tokyo (JP)

(72) Inventors: Keisuke Niimoto, Kawasaki (JP); Kiyoshi Katano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/512,671

(22) Filed: Jul. 16, 2019

(65) Prior Publication Data

US 2020/0045204 A1    Feb. 6, 2020

(30) Foreign Application Priority Data

Aug. 1, 2018  (JP) .............................. JP2018-145426
Aug. 1, 2018  (JP) .............................. JP2018-145428

(51) Int. Cl.
  *H04N 1/44*    (2006.01)
  *H04L 29/06*   (2006.01)

(52) U.S. Cl.
  CPC ......... *H04N 1/4426* (2013.01); *H04L 63/102* (2013.01)

(58) Field of Classification Search
  CPC ............. H04N 1/4426; H04N 1/32117; H04N 1/00244; H04N 2201/0094; H04N 1/00474; H04N 2201/3202; H04L 63/102
  See application file for complete search history.

(56) References Cited

U.S. PATENT DOCUMENTS

| 9,769,333 | B2 | 9/2017 | Miyazawa | |
|---|---|---|---|---|
| 2008/0068647 | A1* | 3/2008 | Isobe | H04N 1/00501 358/1.15 |
| 2016/0057295 | A1* | 2/2016 | Miyazawa | H04N 1/32117 358/1.14 |

FOREIGN PATENT DOCUMENTS

JP    2016045679    4/2016

* cited by examiner

*Primary Examiner* — Iriana Cruz
(74) *Attorney, Agent, or Firm* — Venable LLP

(57) ABSTRACT

An electronic device is capable of communicating with a management server through a network, the management server being capable of transmitting information to a plurality of service providing servers. The electronic device includes: a communication unit configured to connect the electronic device to the network; a management unit configured to be capable of managing permission state information in a state where the electronic device is not connected to the network by the communication unit, the permission state information indicating whether transmission of device information from the electronic device is permitted by a user; and a processing unit configured to perform a process for transmitting the device information to the management server in a state where the electronic device is connected to the network by the communication unit in a case where the permission state information indicates that the transmission of the device information is permitted by the user.

22 Claims, 11 Drawing Sheets

ELECTRONIC DEVICE, CONTROL METHOD OF ELECTRONIC DEVICE, INFORMATION PROCESSING SYSTEM, AND STORAGE MEDIUM

BACKGROUND OF THE INVENTION

Field of the Invention

The present invention relates to a technique for transmitting information of an electronic device to a service management server that is capable of communicating with a service providing server that provides a service.

Description of the Related Art

Log information such as usage information and history information of a user and status information (for example, ink remaining amount information) indicative of a state of a multifunctional peripheral (MFP), which can be obtained in the MFP, are starting to be utilized for various services. For example, it has been suggested to provide a new service in accordance with a state of an MFP by transmitting status information to a server with the consent of a user and analyzing the status information on the server side. In addition, there has been a suggestion of a service such as providing benefits to users with frequent use by referring to log information on the server side.

Japanese Patent Laid-Open No. 2016-45679 (hereinafter referred to as Document 1) discloses a technique of preparing a relay device that manages a state of service utilization permission and a state of service registration, etc., and centrally managing permission states and registration states of all services in the relay device. Further, it is disclosed that, in a case where a user requests for utilizing a service, an MFP inquires the relay device about the state of utilization permission and the state of registration, etc.

SUMMARY OF THE INVENTION

In order to utilize log information and status information, permission for transmitting the information should be obtained from a user. In the technique of Document 1, the relay device manages the permission state. Therefore, if the MFP is not connected to a network such as the Internet in a case where a user requests for utilizing a service, the MFP is not able to check the permission state and not able to utilize the service. For this reason, an opportunity for letting a user start utilizing a service is restricted due to a network state.

The electronic device according to an embodiment of the present invention is an electronic device capable of communicating with a management server through a network, the management server being capable of transmitting information to a plurality of service providing servers, the electronic device including: a communication unit configured to connect the electronic device to the network; a management unit configured to be capable of managing permission state information in a state where the electronic device is not connected to the network by the communication unit, the permission state information indicating whether transmission of device information from the electronic device is permitted by a user; and a processing unit configured to perform a process for transmitting the device information to the management server in a state where the electronic device is connected to the network by the communication unit in a case where the permission state information indicates that the transmission of the device information is permitted by the user.

Further features of the present invention will become apparent from the following description of exemplary embodiments with reference to the attached drawings.

DESCRIPTION OF THE EMBODIMENTS

Hereinafter, an explanation is given of embodiments of the present invention with reference to the drawings. It should be noted that the following embodiments do not limit the present invention and that every combination of the characteristics explained in the present embodiments is not essential to the solution means of the present invention. Note that, in the following explanation, the same sign refers to the same configuration.

First Embodiment

<System Configuration>

Figure 1:
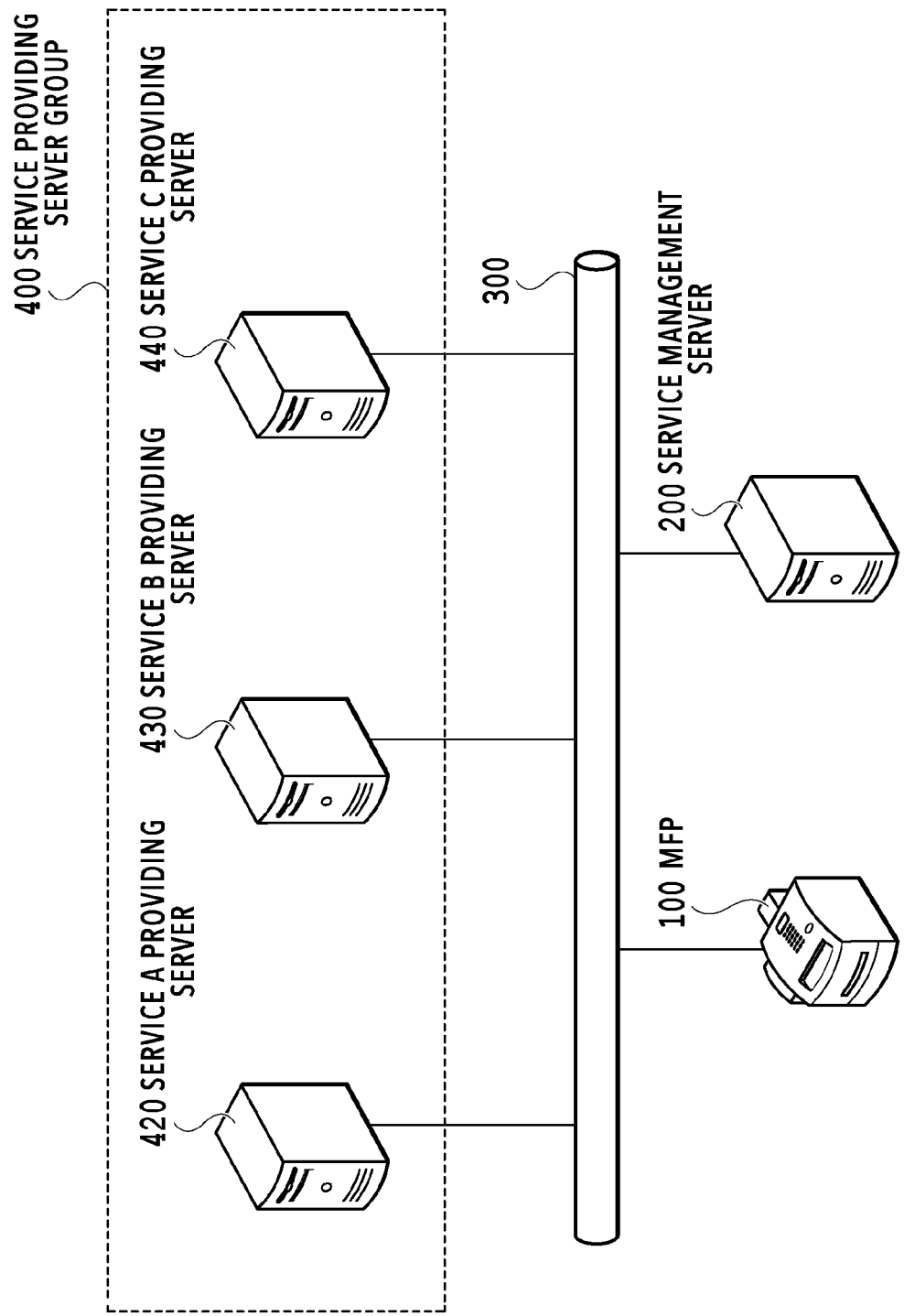
FIG. 1 is a configuration diagram of an information processing system.

FIG. 1 is a configuration diagram illustrating the overall configuration of the information processing system. The information processing system includes an MFP 100, a service management server 200, a service providing server group 400, and a communication network 300. The service providing server group 400 is a collective term for service providing servers that provide respective services. In the example of FIG. 1, the service providing server group 400 includes: a Service A providing server 420 that provides Service A; a Service B providing server 430 that provides Service B; and a Service C providing server 440 that provides Service C.

<System Overview>

An explanation is given of an overview of the processing performed in the present system. Firstly, an example of a service provided by the present system is explained. An example of the service is a service of providing points to a user according to log information in the MFP 100 such as usage information and history information of the user. More specifically, log information is information of a memory of events that have occurred in the MFP 100 such as an error occurrence situation, the number of times of printing, and the number of printed sheets.

Another example of the service is a service according to status information, which is indicative of a state of the MFP 100. For example, there is an automatic delivery service of consumables for the MFP 100 such as ink and toner. In the automatic delivery service, in a case where a remaining amount of consumables falls to or below a predetermined level, the consumables are automatically ordered and delivered. In this case, the status information is identification information that identifies the consumables and information indicative of the remaining amount of the consumables that corresponds to the identification information.

Another example of the service is a contents printing service. In the contents printing service, contents such as a picture of the user or contents such as a template for picture-coloring provided by the service providing server is printed by the MFP 100. In this case, the status information is information indicative of a state of the MFP 100 and the print result.

It can be said that the above log information and status information are information indicative of a state relating to the MFP 100 device. Alternatively, it can be also said that the above log information and status information are information relating to a state of the MFP 100 being used by the user. The log information and status information are collectively referred to as device-provided information. Hereinafter, device-provided information is simply referred to as device information. The services described above are merely examples and the present invention is not limited thereto. Any service may be applicable as long as the service providing server uses device information of the MFP 100 for the service. In addition, device information is not limited to those in the examples described above.

Note that, in FIG. 1, the MFP 100, the service management server 200, and the service providing server group 400 are connected via the communication network 300. However, in the present embodiment, the MFP 100 transmits and receives information to and from the service management server 200. Each service providing server of the service providing server group 400 transmits and receives information to and from the service management server 200. That is, the MFP 100 does not directly transmit and receive information to and from each service providing server of the service providing server group 400. In addition, specifically, the communication network 300 is the Internet. For example, the MFP 100 is connected to a wireless LAN via an external access point and is further connected to the Internet by a router-function provided in the external access point (that is, in a case where the external access point is a wireless LAN router). Therefore, the MFP 100 and the service management server 200 are connected via the Internet.

In the present embodiment, by providing the service management server 200, information of the MFP 100 that is necessary for various services can be collected by the service management server 200, for example. Further, the service management server 200 exchanges information with service providing servers that provide various services, and thereby the MFP 100 does not have to directly exchange information with the service providing servers.

For providing such services as described above, firstly, permission should be obtained from the user. This is because device information such as log information and status information of the MFP 100 will be provided to the outside. Furthermore, aside from the permission for providing device information to the outside, registration for utilizing a service is additionally performed through a web page or the like between a user and a service providing server. Generally, the series of the above processes is required for each service.

In the present embodiment, the procedure required to utilize a service is divided into two stages. The first stage is a procedure for obtaining permission from the user for transmitting device information to the outside. Here, permission common to all services is obtained from the user. That is, as permission common to all services, permission for transmitting device information to the outside is obtained.

The second stage is a procedure for performing utilization registration that is particular to each service. Further, in the present embodiment, the MFP 100 manages the information obtained in the first stage, that is, the information indicative of a permission state, which is common to all services. According to such a configuration as above, even in a case where the MFP 100 is in the offline state, the user can perform a permission setting for transmitting device information to the outside. For this reason, it is possible to prevent access for a user to utilize a service from being restricted due to a network state.

In a case where the information indicative of the permission state indicates that transmission of device information to the outside is permitted, the MFP 100 performs a process for transmitting device information to the service management server 200. In a case where processing for registering the MFP 100 has not been performed in the service management server 200, the MFP 100 performs device registration processing with the service management server 200. In a case where the registration processing is completed in the service management server 200, device information is regularly or irregularly transmitted from the MFP 100 to the service management server 200.

Transmission of information from the service management server 200 to each service providing server included in the service providing server group 400 is performed in a case where a condition for utilizing each service is satisfied. As a condition for utilization, for example, registration processing for utilizing a service is performed between a user and each service providing server. In a case where a condition for utilizing a service is satisfied, each service providing server receives information (i.e., a part of device information) necessary for providing the service from the service management server 200 and provides the service. For each communication, control through HTTP, XMPP, etc., is performed. Note that another protocol may be used for the protocol.

<Block Diagram>

Figure 2:
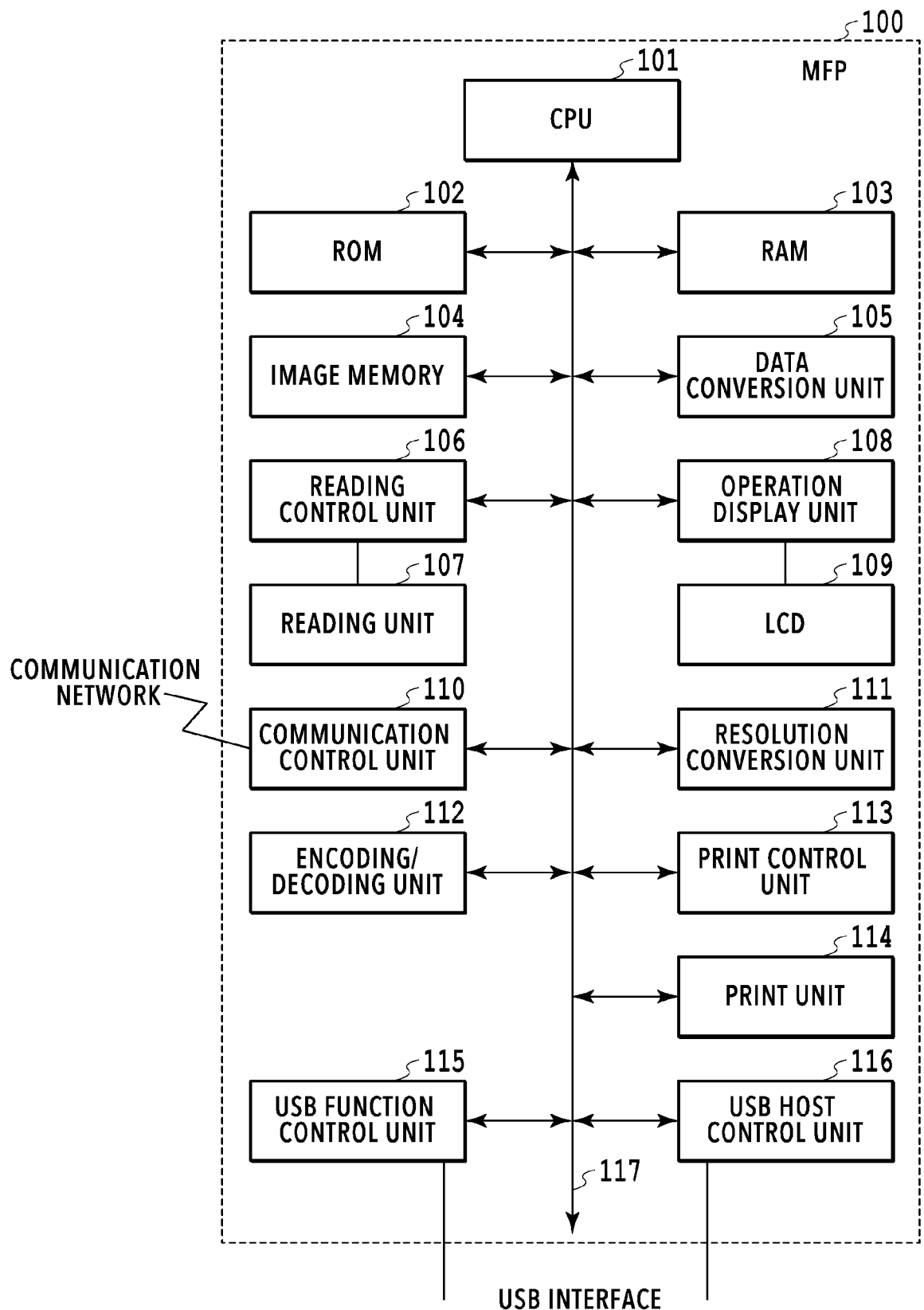
FIG. 2 is a block diagram of an MFP.

FIG. 2 is a block diagram illustrating a schematic configuration example of the MFP 100 in the present embodiment. The MFP 100 is a kind of information processing apparatus. Further, the MFP 100 is also a kind of electronic device. The MFP 100 according to the present embodiment has an information processing function such as generating, memorizing, and transmitting device information including log information and status information. Furthermore, the MFP 100 has an image forming function for forming an image on a print medium by use of the later-described print control unit 113 and print unit 114.

The MFP 100 includes a CPU (Central Processing Unit) 101, a ROM (Read Only Memory) 102, a RAM (Random Access Memory) 103, an image memory 104, a data conversion unit 105, a reading control unit 106, a reading unit 107, an operation display unit 108, an LCD 109, a communication control unit 110, and a resolution conversion unit 111. Furthermore, the MFP 100 includes an encoding/decoding unit 112, a print control unit 113, a print unit 114, a USB function control unit 115, a USB host control unit 116, and a bus 117.

The CPU 101 is a system control unit that controls the entire MFP 100. The ROM 102 is a non-volatile memory that stores fixed data such as a control program, a data table, and an embedded operating system (OS) to be executed by the CPU 101. In the present embodiment, software execution control such as scheduling, task switching, and interrupt processing is performed to each control program stored in the ROM 102 under the control of the embedded OS stored in the ROM 102. The ROM 102 memorizes information indicative of a permission state, which indicates whether to provide device information to the outside. The RAM 103 is configured with a static random access memory (SRAM) that requires a backup power source, etc., and the power supply to the RAM 103 is ensured by a primary battery (not illustrated in FIG. 2) for data backup. The RAM 103 stores program control variables, etc. The image memory 104 is configured with a dynamic random access memory (DRAM), etc., and is capable of storing image data. In addition, a partial area of the image memory 104 is secured as a work area for execution of software processing. The data conversion unit 105 is capable of performing conversion of image data, which includes analysis of a page description language (PDL) and CG (Computer Graphics) development of character data.

The reading unit 107 optically reads a document by use of a CIS (Contact Image Sensor) image sensor and converts the document into an electrical image signal. The reading control unit 106 performs various types of image processing such as binarization processing and half tone processing on the image signal and outputs high-resolution image data. Note that the method for optically reading a document may be either by a sheet reading control scheme, in which a fixed CIS image sensor reads a document, or by a book reading control scheme, in which a movable CIS image sensor reads a document fixed on a platen.

The operation display unit 108 is configured with the bare minimum required keys such as a numeral input key, a mode setting key, a determination key, and a cancel key; as well as an LED (light emitting diode) and a 7-segment display unit, etc. The various keys described above are realized by what is termed soft keys displayed on the LCD 109 and are capable of receiving an operation from a user. The LCD 109 switches the backlight of the LCD 109 to off in order to reduce power consumption in a case where an operation has not been performed by a user for a predetermined period of time.

The communication control unit 110 controls communication between the MFP 100 and the communication network 300 to connect to an Internet service provider and to communicate with the service management server 200 for various kinds of data. Furthermore, the communication control unit 110 is capable of determining whether the MFP 100 is connected to the Internet or connected only to a LAN. Note that the connection between the communication control unit 110 and the communication network 300 is conducted in a publicly known method such as HTTP or XMPP. The resolution conversion unit 111 performs resolution conversion processing such as mutual conversion between millimeter-based image data and inch-based image data. Note that the resolution conversion unit 111 is also capable of executing enlargement/reduction processing of image data. The encoding/decoding unit 112 performs encoding/decoding processing or enlargement/reduction processing on image data (i.e., not-compressed, MH, MR, MMR, JBIG, JPEG, etc.) which is handled by the MFP 100. The print control unit 113 performs various kinds of image processing such as smoothing processing, record density correction processing, or color correction on image data to be printed, so as to convert the image data into high-resolution image data and output the high-resolution image data to the print unit 114. Furthermore, the print control unit 113 also plays a role of regularly obtaining state information data of the print unit 114. The print unit 114 is configured with a laser beam printer, an inkjet printer, or the like, and prints image data generated by the print control unit 113 on a print medium such as a sheet.

The USB function control unit 115 performs protocol control in accordance with USB communication standard. The USB host control unit 116 is a control unit for performing communication according to the protocol defined by USB communication standard. USB communication standard is a standard for bi-directional high speed data communication. Further, USB communication standard defines that one host (i.e., master) can be connected by multiple hubs or functions (i.e., slaves). That is, the USB host control unit 116 provides a function as a host in USB communication. The configurations other than the reading unit 107 and the LCD 109 are mutually connected via the bus 117.

Figure 3:
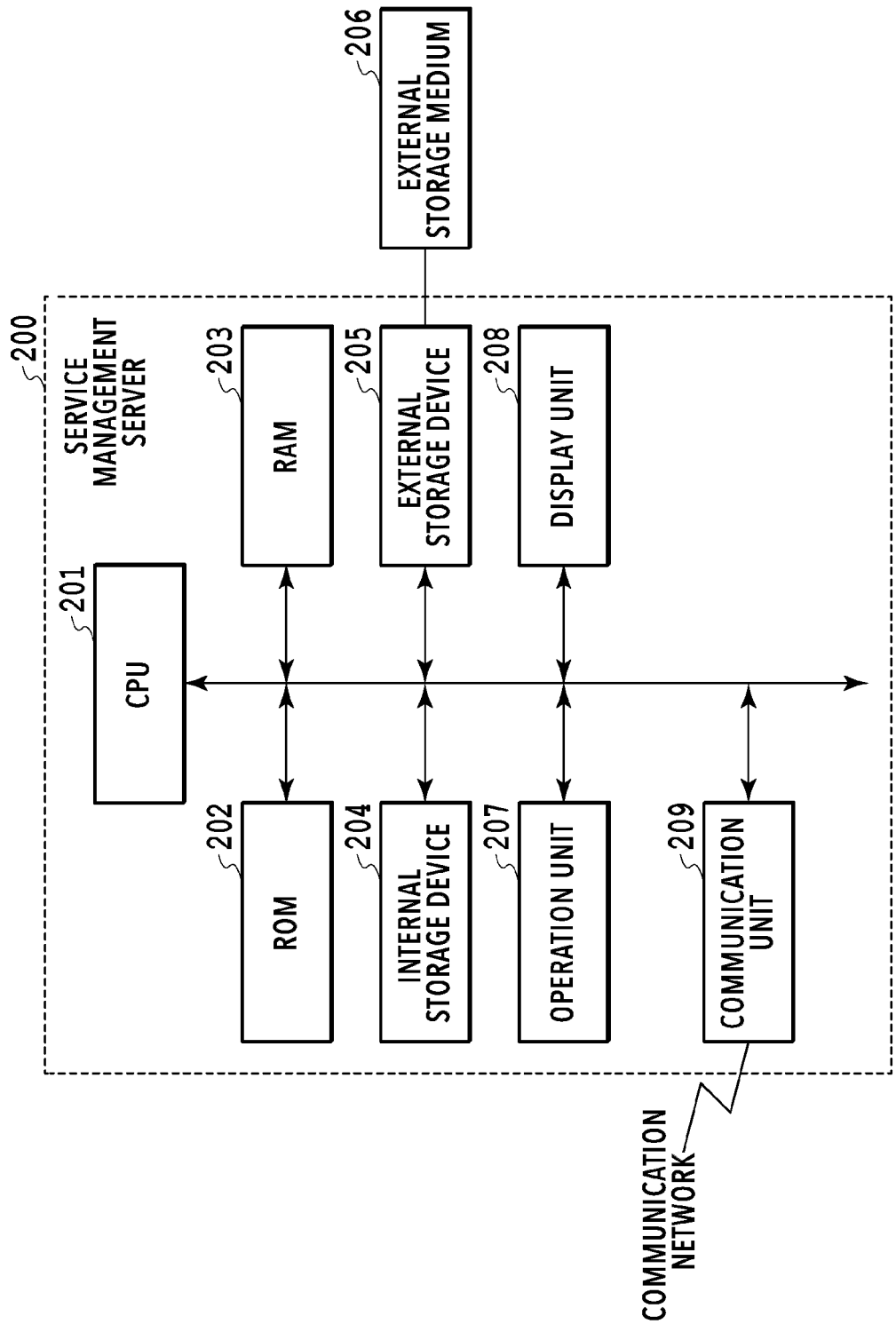
FIG. 3 is a block diagram of a present service management server.

FIG. 3 is a block diagram illustrating a schematic configuration example of the service management server 200 in the present embodiment. The service management server 200 is an information processing apparatus and includes a CPU 201, a ROM 202, a RAM 203, an internal storage device 204, an external storage device 205, an operation unit 207, a display unit 208, and a communication unit 209.

The CPU 201 controls the overall operation of the service management server 200 according to a program retrieved from the ROM 202, the RAM 203, the internal storage device 204, or an external storage medium 206 to the external storage device 205. The ROM 202 stores a control program of the CPU 201 and the like. The RAM 203 temporarily memorizes programs and various kinds of data and operates the processing of the service management server 200 at high speed. The internal storage device 204 stores an operating system, various application programs, various kinds of data, and the like. Furthermore, the internal storage device 204 stores device information (i.e., log information and status information) transmitted from the MFP 100. Device information will be described later. Additionally, application software for transmitting and receiving various control commands and data is installed in the internal storage device 204. The operation unit 207 is an input device such as a keyboard and a mouse and receives an instruction input from an operator of the service management server 200. The display unit 208 displays various kinds of information for the operator. The communication unit 209 is connected to the communication network 300 to connect to an Internet service provider and to communicate with the MFP 100 and each service providing server included in the service providing server group 400 for various kinds of data. Note that the connection to the communication network 300 is conducted in a publicly known method such as HTTP or XMPP.

Figure 4:
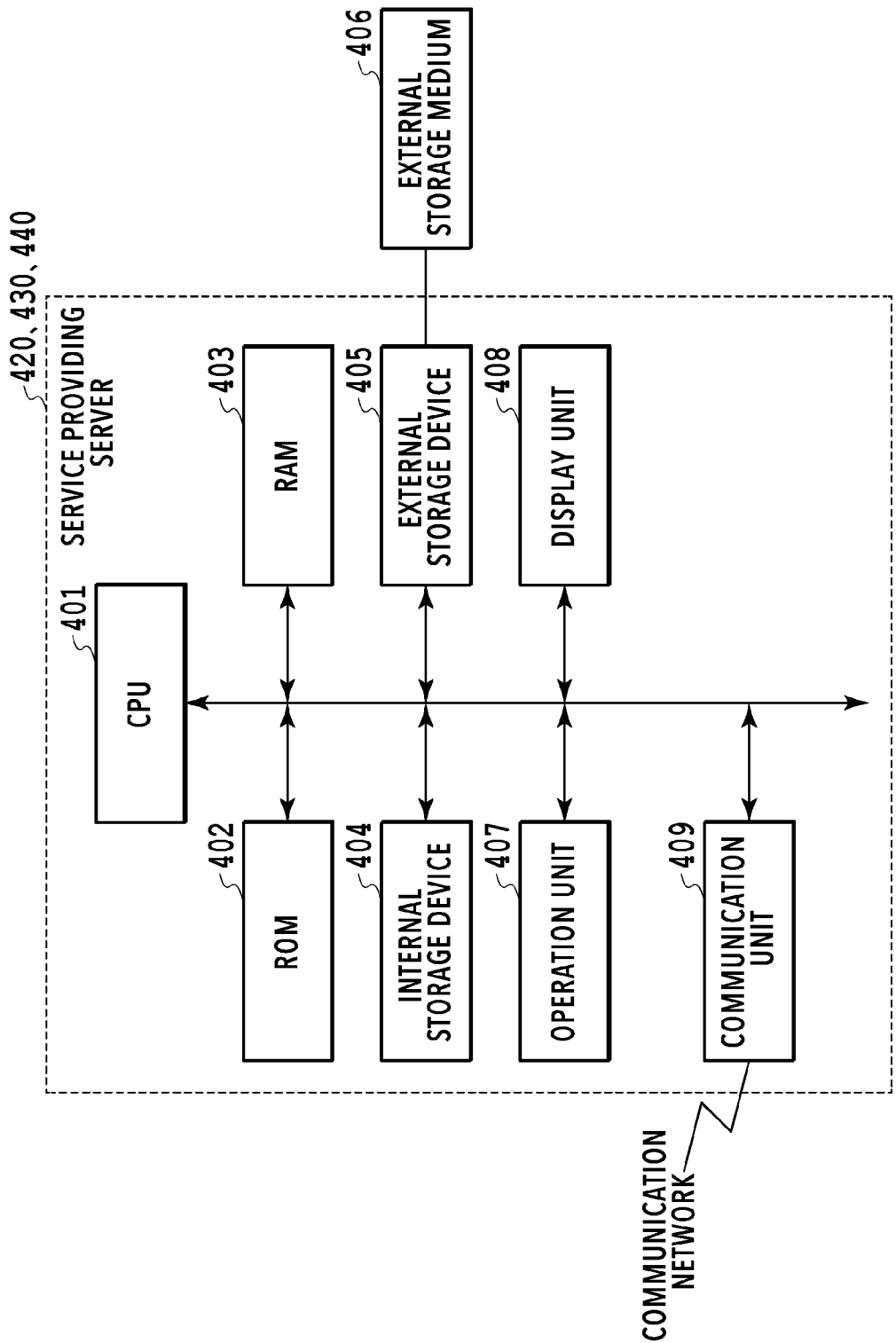
FIG. 4 is a block diagram of a service providing server.

FIG. 4 is a block diagram illustrating a schematic configuration example of each service providing server included in the service providing server group 400 in the present embodiment. Specifically, a configuration example of a Service A providing server 420, a Service B providing server 430, or a Service C providing server 440 is illustrated. Each service providing server includes a CPU 401, a ROM 402, a RAM 403, an internal storage device 404, an external storage device 405, an operation unit 407, a display unit 408, and a communication unit 409.

The configuration other than the internal storage device 404 and the communication unit 409 is the same as that of the service management server 200 in FIG. 3, and therefore explanation thereof is omitted. The internal storage device 404 stores an operating system, various application programs, various kinds of data, and the like. Furthermore, application software for transmitting and receiving various control commands and data to and from the service management server 200 is installed in the internal storage device 404. A communication unit 409 is connected to the communication network 300 to connect to an Internet service provider and to communicate with the service management server 200 for various kinds of data.

<Explanation for Functions of the System>

Figure 5:
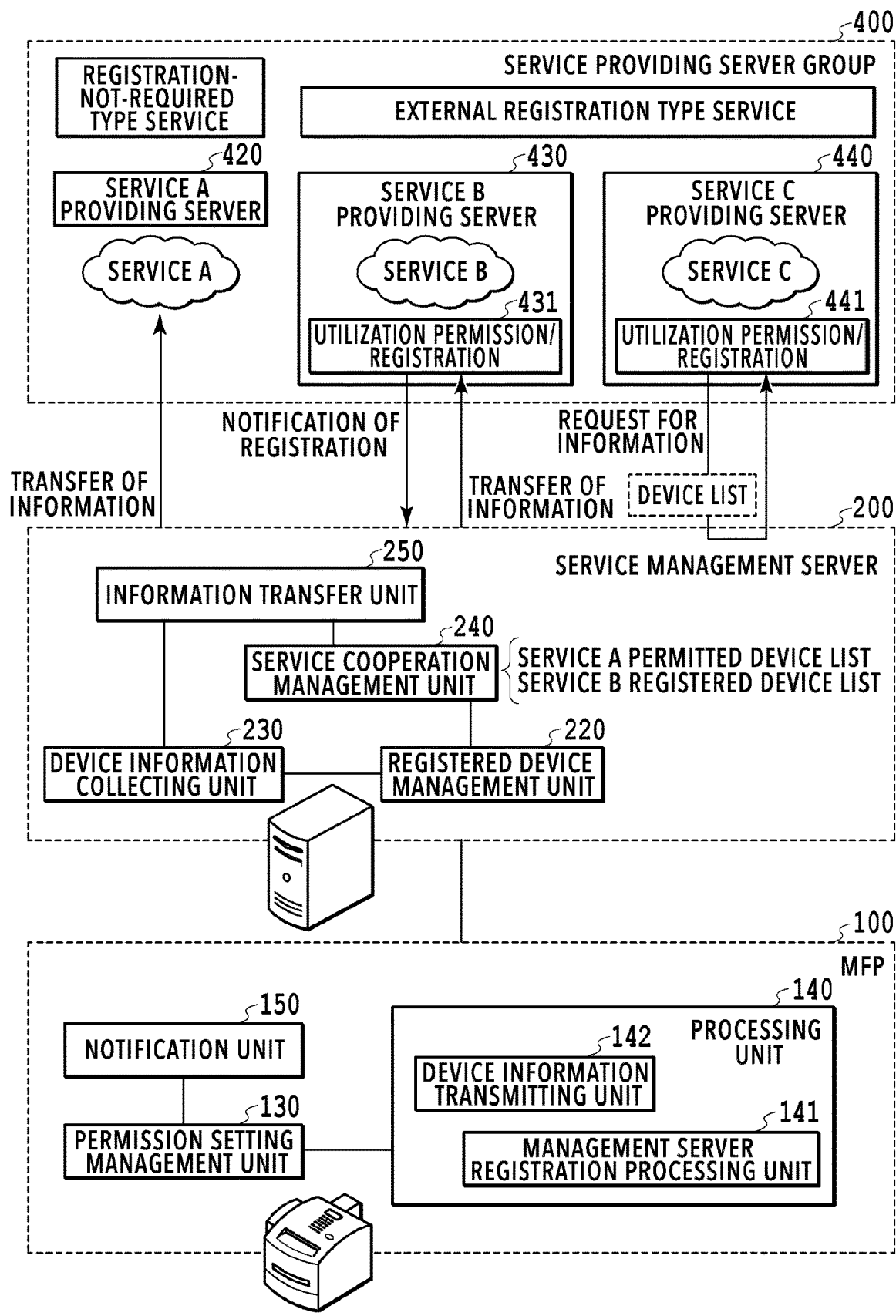
FIG. 5 is a diagram illustrating an overall relationship of the MFP, the service management server, and each service providing server.

FIG. 5 is a diagram illustrating the overall relationship of the system including the MFP 100, the service management server 200, and each service providing server of the service providing server group 400 in the present embodiment. Regarding the MFP 100 and the service management server 200, function block diagrams are also included.

The MFP 100 includes a permission setting management unit 130, a processing unit 140, and a notification unit 150. The processing unit 140 includes a management server registration processing unit 141 and a device information transmitting unit 142. The CPU 101 of the MFP 100 retrieves programs stored in the ROM 102 to the RAM 103 and executes the programs, so as to function as each unit illustrated in FIG. 5.

The permission setting management unit 130 is capable of managing information (hereinafter referred to as "permission state information") indicative of a permission state, which indicates whether transmission of device information is permitted by the user. As described above, device information includes log information and status information of the MFP 100, for example. Permission state information is common to the services provided by the respective service providing servers of the service providing server group 400. The permission setting management unit 130 is capable of managing permission state information even in a case where the communication in the communication network 300 is not effective, that is, even in a case of the offline state. In addition, the permission setting management unit 130 is capable of changing permission state information in the offline state. Permission state information is, for example, information indicative of either one of unset, which is in an initial state; a permission setting, which is indicative of permission; and a cancellation setting, in which permission has been canceled.

The processing unit 140 performs processing for transmitting device information to the service management server 200 in a case where the common permission state information, which is managed in the permission setting management unit 130, has a value indicative of the permission setting. In a case where the permission state information managed by the permission setting management unit 130 is indicative of the permission setting, that is, in a case where the user has performed a common permission setting, the management server registration processing unit 141 included in the processing unit 140 performs processing of registering the MFP 100 in the service management server 200. The device information transmitting unit 142 included in the processing unit 140 performs processing of transmitting device information to the service management server 200 in a case where: the permission state information managed in the permission setting management unit 130 is indicative of the permission setting; and the MFP 100 has already been registered in the service management server 200. The device information transmitting unit 142 transmits device information to the service management server 200 irregularly or regularly at a predetermined timing.

The notification unit 150 provides a notification for prompting the user for the permission setting. For example, the notification unit 150 displays a notification for prompting the user for the permission setting on the operation display unit 108. Note that, in a case where the common permission state information, which is managed in the permission setting management unit 130, has a value indicative of the permission setting, the notification unit 150 does not provide the notification any more. For example, in a case where the user has given an input for changing the permission state information to a value indicative of the permission setting in order to utilize a first service, the process of inputting the permission setting is not needed any more for utilizing a second service, which is different from the first service. Therefore, in a case where the permission state information managed in the permission setting management unit 130 is indicative of the permission setting, the notification unit 150 does not provide the notification for prompting the user for the permission setting.

As described above, the MFP 100 has a device transmitting function that transmits device information to the service management server 200. Activation and deactivation of the device transmitting function is switched in accordance with permission state information managed in the permission setting management unit 130. In a case where the device transmitting function is activated, device information including all the information necessary for each service is transmitted to the service management server 200.

The common permission state information is managed by the permission setting management unit 130 in the MFP 100, and therefore the user can input the permission setting without communication with the service management server 200, etc. That is, in the present embodiment, common permission state information can be set in the offline state. It is possible to change the setting of the common permission state information, based on an input by the user through the operation display unit 108 of the MFP 100, for example. Alternatively, the setting can be changed through a PC (Personal Computer) application or a smartphone application that can communicate with the MFP 100. Upon detecting an input for changing the setting of the common permission state information (i.e., an update to a value that is indicative of permission), processing for registering the MFP 100 in the service management server 200 is performed by the management server registration processing unit 141. After the registration processing is performed, transmission of device information from the device information transmitting unit 142 to the service management server 200 is initiated. Note that, in a case where the setting of the common permission state information is changed in the offline state, the management server registration processing unit 141 performs the registration processing with the service management server 200 at the timing where the MFP 100 is connected to the network.

Next, an explanation is given of the service management server 200. The service management server 200 includes a registered device management unit 220, a device information collecting unit 230, a service cooperation management unit 240, and an information transfer unit 250. The CPU 201 of the service management server 200 retrieves programs stored in the ROM 202 to the RAM 203 and executes the programs, so as to function as each unit illustrated in FIG. 5. The service management server 200 is configured to be capable of transmitting at least a part of information included in device information to each service providing server that provides a service.

The registered device management unit 220 manages the MFP 100 registered in the service management server 200. For example, the registered device management unit 220 manages the MFP 100 by applying predetermined identification information to the MFP 100, whose management server registration processing unit 141 has performed the registration processing with the registered device management unit 220.

The device information collecting unit 230 collects device information transmitted from the MFP 100, which is managed in the registered device management unit 220. Device information is stored in the internal storage device 204, the external storage device 205, or the external storage medium 206.

The service cooperation management unit 240 causes each service providing server of the service providing server group 400 and the service management server 200 to cooperate with each other. In the present embodiment, utilization permission and registration processing relating to utilization of a service is performed between a user and a service providing server. This utilization permission is permission other than the common permission setting described above. That is, the utilization permission corresponds to utilization permission for a particular service. The service cooperation management unit 240 receives, from each service providing server, device identification information of the device (i.e., MFP 100) for which utilization permission and registration processing has been performed. Further, the service cooperation management unit 240 updates a list of devices that utilizes each service. Note that, in the present embodiment, there is also a service providing server that provides a service that does not require utilization permission. Details will be described later.

The information transfer unit 250 transmits, to each service providing server of the service providing server group 400, device information necessary for each service. In the present embodiment, device information collected by the device information collecting unit 230 is information covering information necessary for each service provided by each service providing server of the service providing server group 400. On the other hand, service providing servers do not necessarily use all of the device information. Therefore, out of all the device information, the information transfer unit 250 transfers information necessary for a targeted service to a service providing server.

Next, services provided by respective service providing servers of the service providing server group 400 will be specifically explained. In the present embodiment, service providing servers are categorized into three types of service providing servers according to the kind of service to be provided.

The Service A providing server 420 is a first service providing server that provides a first service. The first service is a registration-not-required type service that does not require utilization registration for receiving the service to be provided. An example of the first service is a trouble/maintenance support service.

Out of the device information collected from the MFP 100, the service management server 200 transfers only the information necessary for the trouble/maintenance support service to the Service A providing server 420 that provides the first service. The device information transferred here includes information necessary for the trouble/maintenance support such as consumption information of consumable parts, ink remaining amount information, or device error information of the MFP 100.

Based on the consumption information, error information, etc., the Service A providing server 420 provides a user or a service staff with a report for specifying the cause at a time of trouble. Additionally, the Service A providing server 420 provides the user with a suggestion of countermeasures by predicting a time of trouble or predicting a timing that would require maintenance, for example.

The Service B providing server 430 is a second service providing server that provides a second service. The second service is an external registration type service that requires service registration through another route (for example, on a Web page displayed by a PC or a smartphone), not by a process through the MFP 100. In this kind of service, in a case where service utilization permission and registration processing 431 is performed, the service management server 200 is notified of completion of the registration for the service together with the device identification information of the device (i.e., MFP 100). In the service management server 200, the device identification information notified from the Service B providing server 430 is managed as a Service B registered device list. An example of the second service is a point service that provides points in accordance with usage conditions of the user. In this case, in order to receive the point service, the user registers the user information and the device identification information for identifying the MFP 100 used by the user in the Service B providing server 430 through a website or a registration application. At this time, the user also agrees on utilization permission for Service B, which is presented by the Service B providing server 430, etc. In a case where the registration is completed, the Service B providing server 430 that provides the point service transmits, to the service management server 200, a notification of completion of the registration and the device identification information for identifying the device (i.e., MFP 100). The registered device notified as such is included in the Service B registered device list and managed in the service management server 200. On the other hand, as described above, the user performs the permission setting for transmitting the device information to the service management server 200. Note that, in a case where the common permission state information managed by the permission setting management unit 130 is changed to a value indicative of permission, it is not necessary to input the setting any more.

Out of the device information collected from the MFP 100, the service management server 200 transfers only information necessary for the point service to the Service B providing server 430 that provides Service B. The device information transferred as such is information of a job executed by the user, information of an attached tank, etc. The Service B providing server 430 provides points to the user in accordance with the information of a job executed by the user and the information of an attached tank. The user can utilize the provided points for benefits such as discounts for purchases of ink and media.

The first service (i.e., Service A) and the second service (i.e., Service B) explained above are types of services in which the service management server 200 transmits information necessary for a service to each service providing server in a Push-type manner. That is, the types of services transmit information from the service management server 200 to a service providing server regularly or irregularly. On the other hand, a third service (i.e., Service C) explained below is a type of service that transmits information necessary for the service in a Pull-type manner. That is, the type of service transmits information from the service management server 200 in response to a request from the service providing server.

The Service C providing server 440 is the third service providing server that provides the third service. As with the second service, the third service is an external registration type service that requires service registration, not by a process through the MFP 100, but through another route. However, unlike the second service, in the third service, the service management server 200 is not notified that the service utilization permission and registration processing 441 have been performed. The Service C providing server 440 requests the service management server 200 for information as needed, and the service management server 200 transfers the necessary information in response to the request for information. In this type of service, the service management server 200 cannot manage the registered device list of Service C. Therefore, the service management server 200 transfers information in response to a request from the Service C providing server 440. An example of the third service (i.e., Service C) is an automatic ink conveyance service that cooperates with another system (i.e., another server). In this case, the user registers, on the system that provides the automatic ink conveyance system, user information and device identification information for identifying the MFP 100 used by the user. At this time, the user also agrees on utilization permission, etc., presented by the Service C providing server 440. In a case where the registration is completed, the registered device (i.e., MFP 100) is managed by the Service C providing server 440. On the other hand, as described above, the user performs the permission setting for transmitting the device information to the service management server 200. Note that, in a case where the common permission state information managed by the permission setting management unit 130 is changed to a value indicative of permission, it is not necessary to input the setting any more.

The service management server 200 that collects device information transmitted from the MFP 100 receives, from the Service C providing server 440, a request for device information together with a list of target devices. In response to the received request, the service management server 200 transfers, to the Service C providing server 440, only the information necessary for the automatic ink conveyance service out of the collected device information. The device information transferred as such is information necessary for the automatic ink conveyance service such as ink remaining amount information.

Note that, in an external registration type service, in order for the service to be provided, it is both necessary that the common permission state information managed by the MFP 100 is indicative of the permission setting and that the service utilization permission and registration for each service has been executed. In a case where one of the above is cancelled, the service cannot be provided.

<Sequence Diagram>

Figure 6:
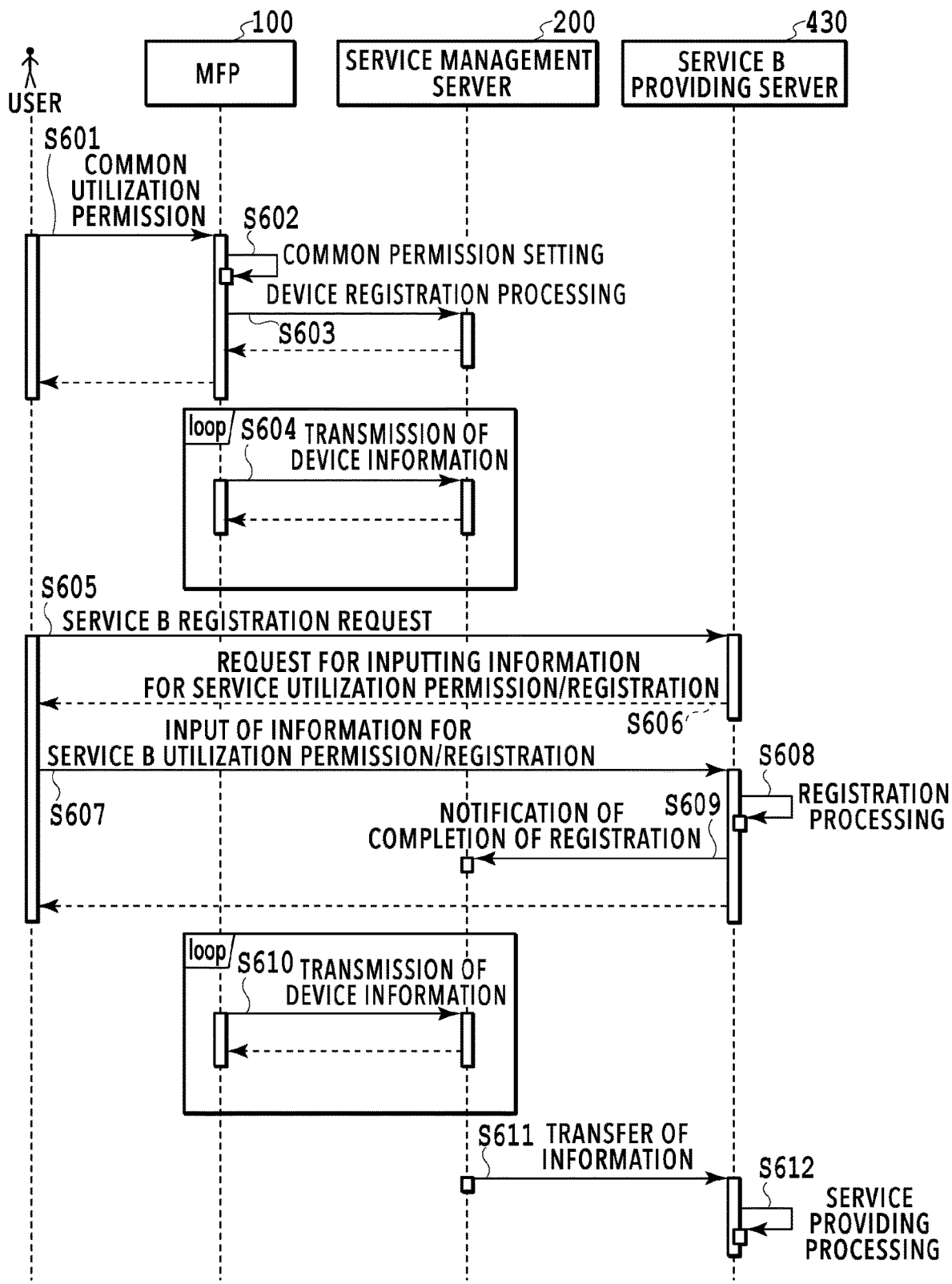
FIG. 6 is a sequence diagram illustrating a registration flow of an external registration Push-type service.

FIG. 6 is a sequence diagram illustrating a flow from utilization registration for Service B, which is an external registration Push-type service, to provision of the service. The series of processing illustrated in the sequence of FIG. 6 is performed by the CPUs of the MFP 100, the service management server 200, and the Service B providing server 430 retrieving a program code stored in each ROM to each RAM and executing the program code. Alternatively, a part or all of the functions in the steps of FIG. 6 may be implemented by hardware such as an ASIC (Application Specific Integrated Circuit) or an electronic circuit. Note that the symbol "S" in the explanation of each process means that it is a step in the flowchart.

In S601, the MFP 100 receives from the user through the operation display unit 108 an input for changing the common permission state information regarding transmission of device information to a value indicative of the permission setting. Note that the initial value of the permission state information is a value indicative of being unset. In S602, the MFP 100 changes the permission state information to a value indicative of the permission setting in response to the change in S601 and stores the permission state information in the permission setting management unit 130 (i.e., ROM 102). The processes from S601 to S602 can be executed in either case of the MFP 100 being in the offline or online state. In S603, the MFP 100 performs processing of registering the MFP 100 in the service management server 200. Note that, in a case where the steps from S601 to S603 have already been executed for utilizing another service, the processes are to be skipped.

In a case where the registration of the device in the service management server 200 is completed, the MFP 100 transmits, in S604, device information necessary for providing services to the service management server 200 as appropriate. For example, the MFP 100 transmits device information to the service management server 200 regularly or irregularly. Furthermore, the device information may not be transmitted at once. That is, transmission of log information and transmission of status information may be performed separately, for example. At this point, since service utilization registration for Service B has not been performed yet, the information transmitted to the service management server 200 remains stored in the service management server 200 and is not transmitted to the Service B providing server 430.

In S605, the Service B providing server 430 receives a Service B registration request from the user. For example, the Service B registration request is received through a website, a registration application, a registration tool dedicated to Service B, or the like. In S606, the Service B providing server 430 requests the user to input service utilization permission and registration information for utilizing Service B. The user, who is requested by the Service B providing server 430 to input the service utilization permission and registration information, inputs as requested. In S607, the Service B providing server 430 receives the input from the user. In S608, the Service B providing server 430 performs authentication or the like and then performs processing of registering the information input by the user. In S609, the Service B providing server 430 notifies the service management server 200 of the registration of Service B, together with information for identifying the device (i.e., MFP 100). The service management server 200, which is notified of the registration of Service B, adds the MFP 100 to the Service B registered device list as the device registered for Service B.

After the registration is completed, the service management server 200 extracts, in S610, information necessary for providing Service B from the device information transmitted from the MFP 100. The information stored in S604 may also be extracted. Then, in S611, the service management server 200 transfers the extracted information (i.e., information necessary for Service B) to the Service B providing server 430 each time of extraction or at once on a regular basis. In S612, the Service B providing server 430 performs processing for providing Service B to the user in accordance with the information transferred from the service management server 200.

As described above, in a Push-type service, the registration state of each service is managed in the service management server 200. Then, the service management server 200 transfers necessary information to service providing servers according to registration states.

Figure 7:
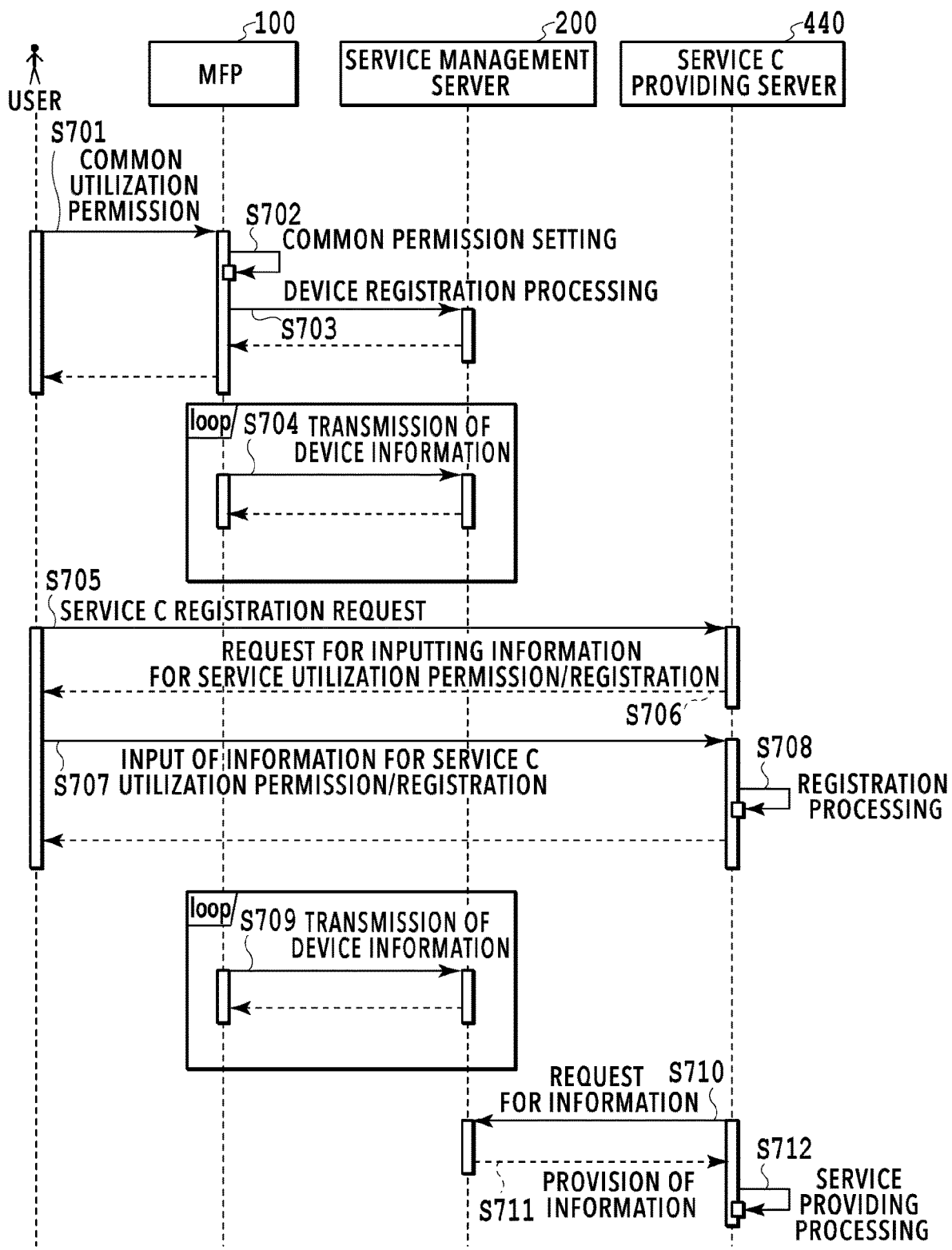
FIG. 7 is a sequence diagram illustrating a registration flow of an external registration Pull-type service.

FIG. 7 is a sequence diagram illustrating a flow from registration for Service C, which is an external registration Pull-type service, to provision of the service. The processes from S701 to S704 can be the same as the those from S601 to S604 of FIG. 6, and therefore explanation thereof is omitted In S705, the Service C providing server 440 receives a Service C registration request from the user. For example, the Service C registration request is received through a website, a registration application, a registration tool dedicated to Service C, or the like. In S706, the Service C providing server 440 requests the user to input service utilization permission and registration information for utilizing Service C. The user, who is requested by the Service C providing server 440 to input the service utilization permission and registration information, inputs as requested. In S707, the Service C providing server 440 receives the input from the user. In S708, the Service C providing server 440 performs authentication or the like and then performs processing of registering the information input by the user.

In the case of Service C, which is a Pull-type, the service management server 200 cannot comprehend the devices (i.e., device identification information) registered for Service C. Therefore, the device information transmitted from the MFP 100 in S709 remains stored in the internal storage device 204 or the like and is not transferred to the Service C providing server 440. In S710, the Service C providing server 440 transmits, to the service management server 200, a request for information necessary to provide Service C, together with information identifying the device. In S711, the service management server 200 transfers the stored information to the Service C providing server 440. In S712, the Service C providing server 440 performs processing for providing Service C to the user in accordance with the information transmitted from the service management server 200.

As explained above, in the present embodiment, the MFP 100 does not manage utilization permission for transmitting device information on a per service basis but manages utilization permission as common permission state information. Therefore, the user only needs to input the common permission setting once as a permission procedure for providing information to the outside, and, in a case of receiving provision of another service, the procedure for the permission setting is not necessary any more. Therefore, convenience for users in a case of adding a service is improved.

Further, in the present embodiment, the MFP 100 manages common permission state information. Therefore, even in a case where the MFP 100 is in the offline state, the MFP 100 can refer to the permission state information, and, in a case where the permission state information is unset, it is possible to prompt the user to input the permission setting. Therefore, it is possible to request the user for permission for utilizing a service without depending on the state of the network communication function of the MFP 100. As a result, such restriction as providing an access for utilization of a service is removed, and it becomes easy to implement various measures for improving a utilization rate.

Further, in the present embodiment, the service management server 200 does not manage the common permission state information of the MFP 100, but the permission state information is managed by the MFP 100. Therefore, the MFP 100 does not have to inquire the service management server 200 about such a status as a utilization permission state of the device. Furthermore, registration for each service is performed between a service providing server and a user. Therefore, the service management server 200 does not have to receive an inquiry from the MFP 100 about the registration state for a service and the utilization permission state of the device. That is, the service management server 200 does not centrally manage the utilization permission state of devices and the registration state for services. Therefore, it is possible for the service management server 200 to transfer necessary information even to a service providing server that provides a Pull-type service, which does not transmit a registration notification to the service management server 200, for example.

Second Embodiment

In the first embodiment, an explanation is given of a mode in which, in a case where the permission state information is indicative of the permission setting, the MFP 100 transmits both log information and status information to the service management server 200. In this case, data collection is performed even in a case where a service of a service providing server is not available. In the present embodiment, an explanation is given of a mode in which data that is suitable in accordance with a situation of service utilization registration is transmitted from the MFP 100 to the service management server 200.

In the present embodiment, information is transmitted from the MFP 100 to the service management server 200 in two divided stages. The first stage is a process in which the MFP 100 transmits log information on the condition that permission for transmitting device information to the outside is obtained from the user. In the present embodiment, permission common to all services is obtained from the user. On the condition that the common permission setting has been performed, log information is transmitted. Then, processing of registering the device (i.e., MFP 100) in the service management server 200 is performed. The second stage is a step in which the MFP 100 transmits status information to the service management server 200 in accordance with contents of a notification received from the service management server 200. The notification from the service management server 200 is received as a response to the processing of registering the device (i.e., MFP 100), a response to an inquiry as to whether transmission of status information is allowed, or a response to transmission of status information.

As described above, device information transmitted from the MFP 100 to the service management server 200 includes log information and status information. Out of device information, log information is information to be used regardless of utilization registration for a service of a service providing server. On the other hand, status information is information to be used in a case where utilization registration for a service of a service providing server is performed. In the present embodiment, the MFP 100 manages information (hereinafter referred to as "permission state information") indicative of a common permission state regarding provision of device information to the outside. Then, in a case where the permission state information is a value indicative of a permission setting, log information is firstly transmitted from the MFP 100 to the service management server 200. On the other hand, status information is transmitted from the MFP 100 to the service management server 200 in a case where contents of a notification from the service management server 200 indicates that transmission of status information is "allowed". For example, in a case where service utilization registration between a user, who uses the MFP 100, and a service providing server is successfully confirmed by the service management server 200, the service management server 200 notifies the MFP 100 of information indicating that transmission is "allowed". In response to the notification, the MFP 100 starts transmission of status information. With such processing, it is possible to prevent the MFP 100 from transmitting unnecessary information.

<Explanation for Functions of the System>

Figure 8:
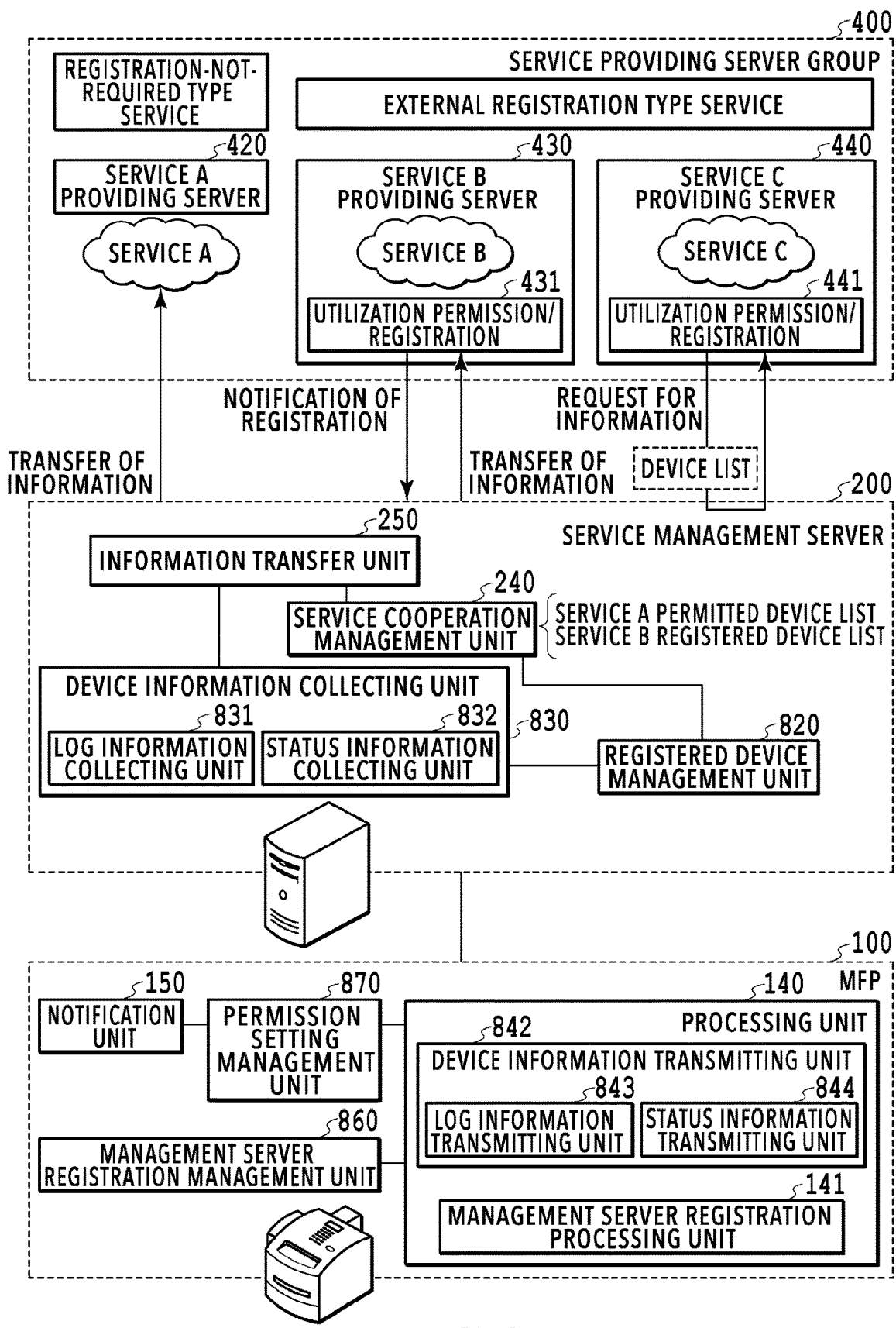
FIG. 8 is a diagram illustrating an overall relationship of the MFP, the service management server, and each service providing server.

FIG. 8 is a diagram illustrating the overall relationship of the system including the MFP 100, the service management server 200, and each service providing server of the service providing server group 400 in the present embodiment. Hereinafter, an explanation is given mainly of the points different from the first embodiment. The same signs are attached to the configurations equivalent to the first embodiment and explanation thereof may be omitted. The MFP 100 includes a permission setting management unit 870, a processing unit 140, a notification unit 150, and a management server registration management unit 860. The processing unit 140 includes a management server registration processing unit 141 and a device information transmitting unit 842. The device information transmitting unit 842 includes a log information transmitting unit 843 and a status information transmitting unit 844.

The permission setting management unit 870 is capable of managing permission state information, which is indicates whether the user has permitted transmission of device information. The permission setting management unit 870 includes a non-volatile memory that memorizes permission state information. The permission setting management unit 870 manages permission state information by use of three values: "0: unset", "1: permission setting", and "2: permission cancelled". As described above, device information includes log information and status information of the MFP 100, for example. Permission state information is common to the services provided by the respective service providing servers of the service providing server group 400. The permission setting management unit 870 is capable of managing permission state information even in a case where the communication in the communication network 300 is not effective, that is, even in a case of the offline state.

In a case where the common permission state information managed by the permission setting management unit 870 is indicative of the permission setting, the processing unit 140 performs processing for transmitting device information to the service management server 200. The device information transmitting unit 842 has a function of transmitting device information to the service management server 200. In the present embodiment, the device information transmitting unit 842 includes the log information transmitting unit 843 and the status information transmitting unit 844 in order to transmit information in two stages. The log information transmitting unit 843 is a first information transmitting unit that transmits first information (i.e., log information), which is transmitted in a case where the common permission state information managed by the permission setting management unit 870 is indicative of the permission setting. The log information transmitting unit 843 regularly or irregularly transmits log information to the service management server 200 at a predetermined timing on the condition that the permission state information managed by the permission setting management unit 870 is indicative of "1: permission setting". The status information transmitting unit 844 is a second information transmitting unit that transmits second information (i.e., status information), which is transmitted in a case where: the common permission setting is set; and the service management server 200 has notified that transmission of status information is allowed.

In a case where the permission state information managed by the permission setting management unit 870 is indicative of the permission setting, that is, in a case where the user has performed the common permission setting, the management server registration processing unit 141 performs processing of registering the MFP 100 in the service management server 200. The management server registration processing unit 141 transmits a registration request to the service management server 200 and receives a notification as a response thereto.

The management server registration management unit 860 manages the registration state of the MFP 100 in service management server 200. The management server registration management unit 860 changes the registration state according to the contents of a notification received by the management server registration processing unit 141. The management server registration management unit 860 includes a non-volatile memory that memorizes the registration state. The management server registration management unit 860 manages the registration state by use of four values: "0: unregistered", "1: registered (transmission not allowed)", "2: registered (transmission allowed)", and "3: deletion uncompleted". The management server registration management unit 860 also memorizes in the non-volatile memory authentication information, which is obtained from the service management server 200 together with a notification of completion of registration received from the service management server 200. Note that, although an example of managing a registration state by use of four values is described in the present embodiment, the present invention is not limited thereto. For example, the management server registration management unit 860 may separately manage a registration state and whether transmission is allowed or not as well. Further, transmission may be regarded as allowed in a case where the registration is completed. Such a way of management can be designed suitably in accordance with characteristics of a service.

A registration completion notification received from the service management server 200 in response to the registration request includes information indicating whether transmission of status information is allowed or not. In a case where the received notification indicates that transmission of status information is "allowed", the management server registration management unit 860 manages the registration state as "2: registered (transmission allowed)". In a case where the received notification indicates that transmission of status information is "not allowed", the management server registration management unit 860 manages the registration state as "1: registered (transmission not allowed)".

The status information transmitting unit 844 transmits status information to the service management server 200 on the condition that the registration state of the management server registration management unit 860 is "2: registered (transmission allowed)" and that the permission state information of the permission setting management unit 870 is indicative of "1: permission setting". After the condition is satisfied, the status information transmitting unit 844 transmits status information to the service management server 200 regularly or irregularly at a predetermined timing.

Note that, although an explanation has been given of a mode in which collection of log information and status information is performed by the service management server 200 in the present embodiment, collection of log information and status information may be performed by another server. Further, collection of log information and collection of status information may be performed by separate data collecting servers.

As described above, the MFP 100 has a device transmitting function that transmits device information to the service management server 200. Activation and deactivation of the device transmitting function is switched in accordance with the permission state information, which is managed by the permission setting management unit 870, and the registration state, which is managed by the management server registration management unit 860. The activation of the device transmitting function is performed in two stages. First, in a case where the transmitting function is activated on the condition that the common permission information is indicative of the permission setting, the function of transmitting the first information (i.e., log information) is activated. Then, in a case where it is notified that transmission of the second information (i.e., status information) is "allowed" and the registration state is updated as such, the function of transmitting the second information (i.e., status information) is activated. The device information including the first information and the second information includes all of the information necessary for each service.

Next, an explanation is given of the service management server 200. The service management server 200 includes a registered device management unit 820, a device information collecting unit 830, a service cooperation management unit 240, and an information transfer unit 250. The device information collecting unit 830 includes a log information collecting unit 831 and a status information collecting unit 832.

The registered device management unit 820 manages the MFP 100 registered in the service management server 200. For example, the registered device management unit 820 manages the MFP 100 by applying predetermined identification information to the MFP 100, whose management server registration processing unit 141 has performed registration processing with the registered device management unit 820. Furthermore, in a case of notifying the MFP 100 of completion of the registration, the registered device management unit 820 determines whether service utilization registration has been performed with service providing servers. For example, with reference to a list managed by the service cooperation management unit 240, in a case where the MFP 100 is included in the list, it is detected that service utilization registration has been performed. In a case where service utilization registration has been performed, the registered device management unit 820 notifies, as a response to the MFP 100 that has provided a registration request, that transmission of status information is "allowed" in addition to notifying that the registration is completed. In a case where service utilization registration has not been performed, the registered device management unit 820 notifies, as a response to the MFP 100 that has provided a registration request, that transmission of status information is "not allowed" in addition to notifying that the registration is completed. Similarly, in a case of receiving an inquiry from the MFP 100 as to whether transmission of status information is allowed or not, the registered device management unit 820 notifies the MFP 100 whether transmission of status information is allowed or not in accordance with whether service utilization registration has been performed or not.

Further, in a case of detecting that utilization of a service is canceled and that there is no service in use, the registered device management unit 820 transmits a notification indicating that transmission of status information is "not allowed" to the MFP 100 as a response to the MFP 100 that has transmitted status information.

The device information collecting unit 830 collects device information transmitted from the MFP 100, which is managed by the registered device management unit 820. That is, the log information collecting unit 831 collects log information and the status information collecting unit 832 collects status information. Device information is stored in the internal storage device 204, the external storage device 205, or the external storage medium 206.

<Sequence Diagram>

Figure 9:
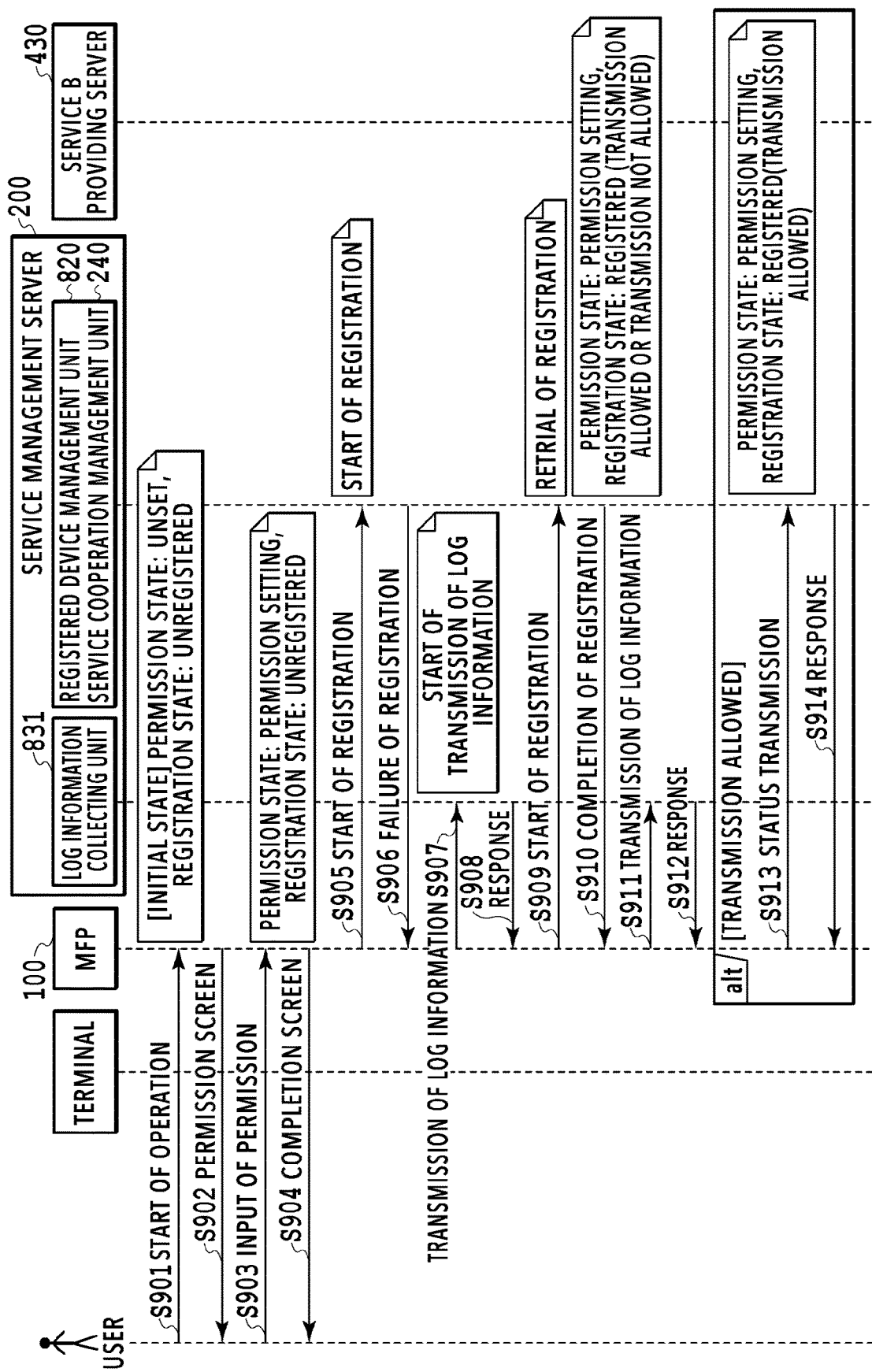
FIG. 9 is a sequence diagram of registering the MFP in the service management server.
Figure 10:
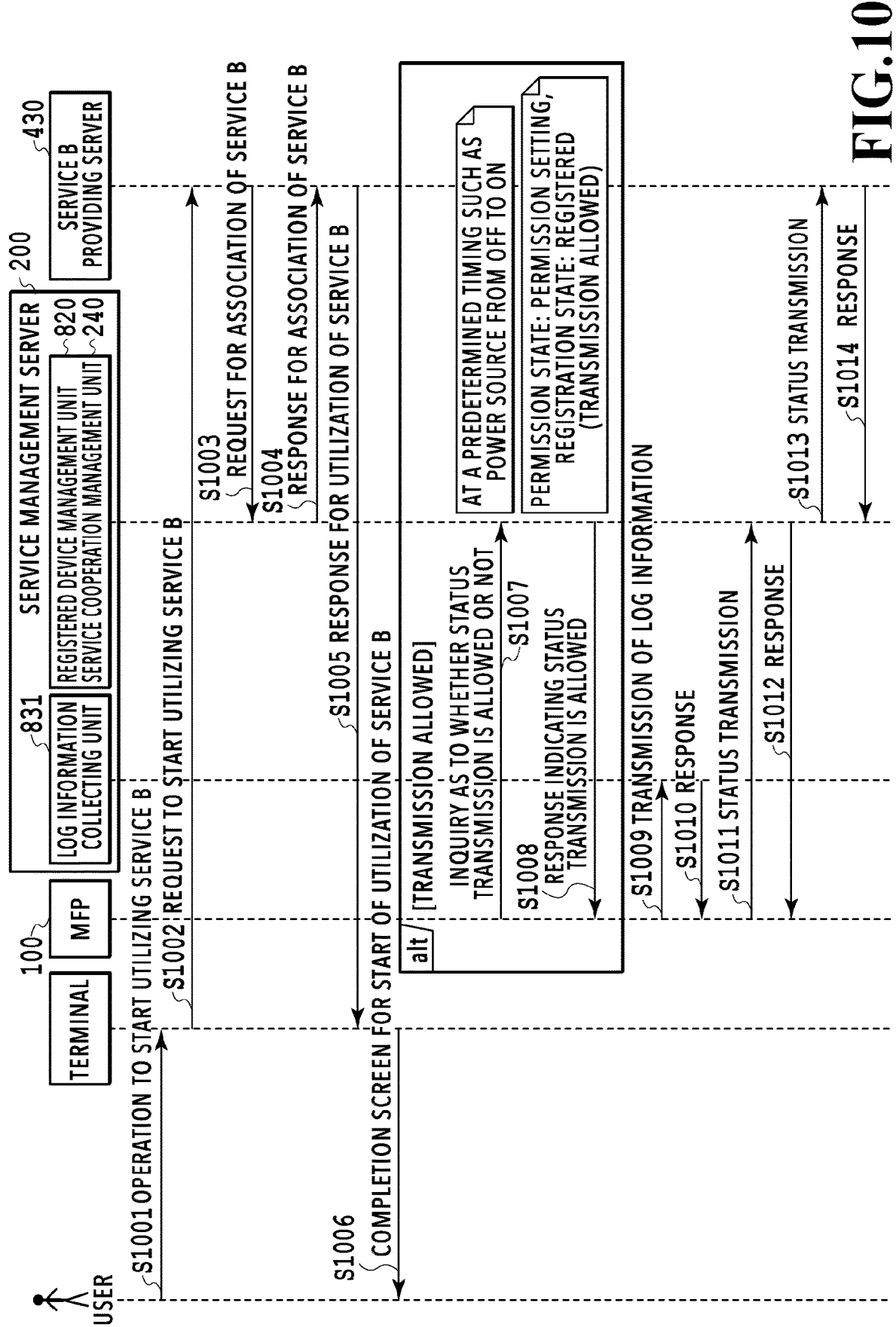
FIG. 10 is a sequence diagram in which status information is transmitted.

FIGS. 9 and 10 are sequence diagrams in a case of utilizing the service of Service B, which is an external registration Push-type. FIG. 9 is a sequence diagram relating to registration processing between the MFP 100 and the service management server 200. FIG. 10 is a sequence diagram relating to processing of performing utilization registration for Service B after the registration processing of FIG. 9.

The series of processing illustrated in each sequence of FIGS. 9 and 10 is performed by the CPUs of the MFP 100, the service management server 200, and the Service B providing server 430 retrieving a program code stored in each ROM into each RAM and executing the program code. Alternatively, a part or all of the functions in the steps of FIG. 9 may be implemented by hardware such as an ASIC or an electronic circuit. Note that the symbol "S" in the explanation of each process means that it is a step in the flowchart.

In S901, the MFP 100 receives from the user an instruction of starting an operation. At this point, the MFP 100 is in the initial state, that is, the state is "permission state: unset" and "registration state: unregistered". Note that the notation "permission state: unset" means that the permission state is in an unset state. The same applies to the registration state. Hereinafter, the same applies to the present specification.

In S902, the MFP 100 displays a permission screen on the operation display unit 108 for a permission operation. In S903, the MFP 100 receives a permission input by the user through the permission screen. In S904, the MFP 100 changes the state to "permission state: permission setting" and displays a completion screen on the operation display unit 108. Thereby, the user recognizes completion of the common permission setting.

In a case where the state is changed to "permission state: permission setting", the management server registration processing unit 141 of the MFP 100 transmits a registration request to the service management server 200 in S905. The service management server 200 starts registration processing in response to the registration request. In S906, the service management server 200 transmits a registration result to the MFP 100. In the example of S906, the registration processing has failed for some reason. In a case where the registration has failed, the state of the MFP 100 remains "registration state: unregistered".

The MFP 100 transmits log information to the service management server 200 in parallel with the registration processing of S905 or before or after the registration processing of S905. In the present embodiment, log information is transmitted from the MFP 100 to the service management server 200 on the condition that the state is changed to "permission state: permission setting". In the example of FIG. 9, log information is transmitted after the registration processing. In S907, the MFP 100 transmits log information to the service management server 200. In S908, the MFP 100 receives a response to the transmission of log information from the service management server 200.

In the example of FIG. 9, the state of the MFP 100 is "permission state: permission setting" and "registration state: unregistered" at the point of S908. Therefore, the MFP 100 retries the registration in the service management server 200 in S909. Note that the MFP 100 keeps retrying until the registration is completed. Further, in a case where the state is changed to "permission state: permission cancelled" before the registration is completed, the MFP 100 stops the registration processing. In the example of FIG. 9, it is assumed that the registration processing is successful in the process of S909. In S910, the service management server 200 transmits a notification of completion of registration to the MFP 100. The MFP 100 changes the registration state in the management server registration management unit 860 with reference to the information included in the notification of completion of registration. That is, the state is changed to "registration state: registered (transmission not allowed)" or "registration state: registered (transmission allowed)".

At this point, the state of the MFP 100 is "permission state: permission setting" and "registration state: registered (transmission not allowed or transmission allowed)". That is, since the state is "permission state: permission setting", log information is continuously transmitted to the service management server 200 in S911, and the response thereto is received in S912.

Here, in a case where the state is "registration state: registered (transmission allowed)", the MFP 100 transmits status information that can be used by each service providing server of the service providing server group 400 to the service management server 200 in S913. In S914, a response thereto is received. As described above, the service management server 200 notifies the MFP 100 that "transmission is allowed" in a case where the MFP 100 is a device registered in a service providing server for utilization of the service. In the example of S 913 of FIG. 9, it is assumed that the service management server 200 notifies that "transmission is allowed" since utilization registration for another service (i.e., Service D) is performed by the user.

Here, the device information transmitted from the MFP 100 to the service management server 200 includes log information, which is a collection of logs, and status information to be utilized by a service providing server in an upper layer. If all of the device information is transmitted in a case where the state is "permission state: permission setting", unnecessary information is transmitted from the MFP 100 to the service management server 200. Therefore, in the present embodiment, in a case where utilization of a service by a service providing server in an upper layer becomes available, the MFP 100 is notified by the service management server 200 that transmission of status information is "allowed". The MFP 100 updates the state to "registration state: registered (transmission allowed)" in response to the notification. The MFP 100 transmits status information to the service management server 200 on the condition that the state is "permission state: permission setting" and "registered state: registered (transmission allowed)". According to such a configuration as above, it is possible to prevent unnecessary information from being transmitted from the MFP 100 to the service management server 200.

Further, as described above, the user registers for utilization of a service through a website, a registration application, or the like, not via the MFP 100. Therefore, the MFP 100 cannot determine that registration for a service is performed between a service providing server and the user. For this reason, the MFP 100 in the present embodiment transmits status information in accordance with whether transmission is allowed or not, which is notified by the service management server 200 that is capable of checking the state of service registration between the user of the MFP 100 and service providing servers. Accordingly, it possible to prevent the MFP 100 from transmitting unnecessary information even in a case where the MFP 100 cannot check the registration state of a service provided by a service providing server.

Furthermore, there may be a case where the user cancels a service provided by a service providing server. In this case, the service management server 200 is notified by the service providing server that the registration state of the service has been cancelled. In response to the notification, the service management server 200 transmits to the MFP 100 a notification indicating that transmission of status information is "not allowed". As described above, it is possible to prevent the MFP 100 from transmitting unnecessary information even in a case where a service provided by a service providing server is cancelled.

FIG. 10 is a sequence diagram after the process of utilization registration for Service B. In the initial state of FIG. 10, it is assumed that the state of the MFP 100 is "permission state: permission setting" and "registration state: registered (transmission not allowed)".

In S1001, the user performs an operation to start utilizing Service B through a terminal. In S1002, the user transmits a request to start utilizing Service B through the terminal to the Service B providing server 430. For example, the user accesses a web page for performing registration for utilizing Service B by use of a terminal in general that has a browser function. The Service B providing server 430 that has received a request from the user transmits a request for association of Service B to the service management server 200 in S1003. In S1004, the service management server 200 transmits a response for association of Service B to the Service B providing server 430. In S1005, the Service B providing server 430 transmits a response for utilization of Service B to the terminal. In S1006, the terminal displays a completion screen for start of utilization of Service B, and the user recognizes completion of the procedure.

On the other hand, the state of the MFP 100 is "registration state: registered (transmission not allowed)". In this case, the MFP 100 inquires the service management server 200 at a predetermined timing whether transmission of status information is allowed or not. This is because the MFP 100 cannot check registration states of services. Therefore, in the example of FIG. 10, the MFP 100 inquires the service management server 200 whether transmission of status information is allowed or not in S1007. For example, the inquiry is performed at a predetermined timing such as a timing where the power source of the MFP 100 is turned on, a timing where a predetermined amount of time has elapsed, or a timing based on a user operation. In S1008, the service management server 200 transmits a response to the inquiry to the MFP 100. In the example of FIG. 10, the service management server 200 manages the registration of Service B performed in S1004. Therefore, in S1008, a response indicative of "transmission allowed" is transmitted from the service management server 200 to the MFP 100. Upon receiving the response, the state of the MFP 100 becomes "registration state: registered (transmission allowed)".

As described above, regardless of registration states, the MFP 100 transmits log information as long as "permission state: permission setting" is set. S1009 and S1010 are transmission of log information and response processing thereto. The MFP 100 transmits status information to the service management server 200 in S1011 in response to the state of "registration state: registered (transmission allowed)". In S1012, the MFP 100 receives a response from the service management server 200. Note that, in the response to the transmission of status information as illustrated in S1012, the service management server 200 may transmit the response including information indicating whether transmission of status information is allowed or not. The MFP 100 is capable of changing the registration state in response to the response.

In S1013, the service management server 200 extracts status information necessary for Service B of the Service B providing server 430 and transfers the status information to the Service B providing server 430. Note that, in a case where log information is necessary for Service B, the log information may be transferred as well. In S1014, the service management server 200 receives a response from the Service B providing server 430.

Figure 11:
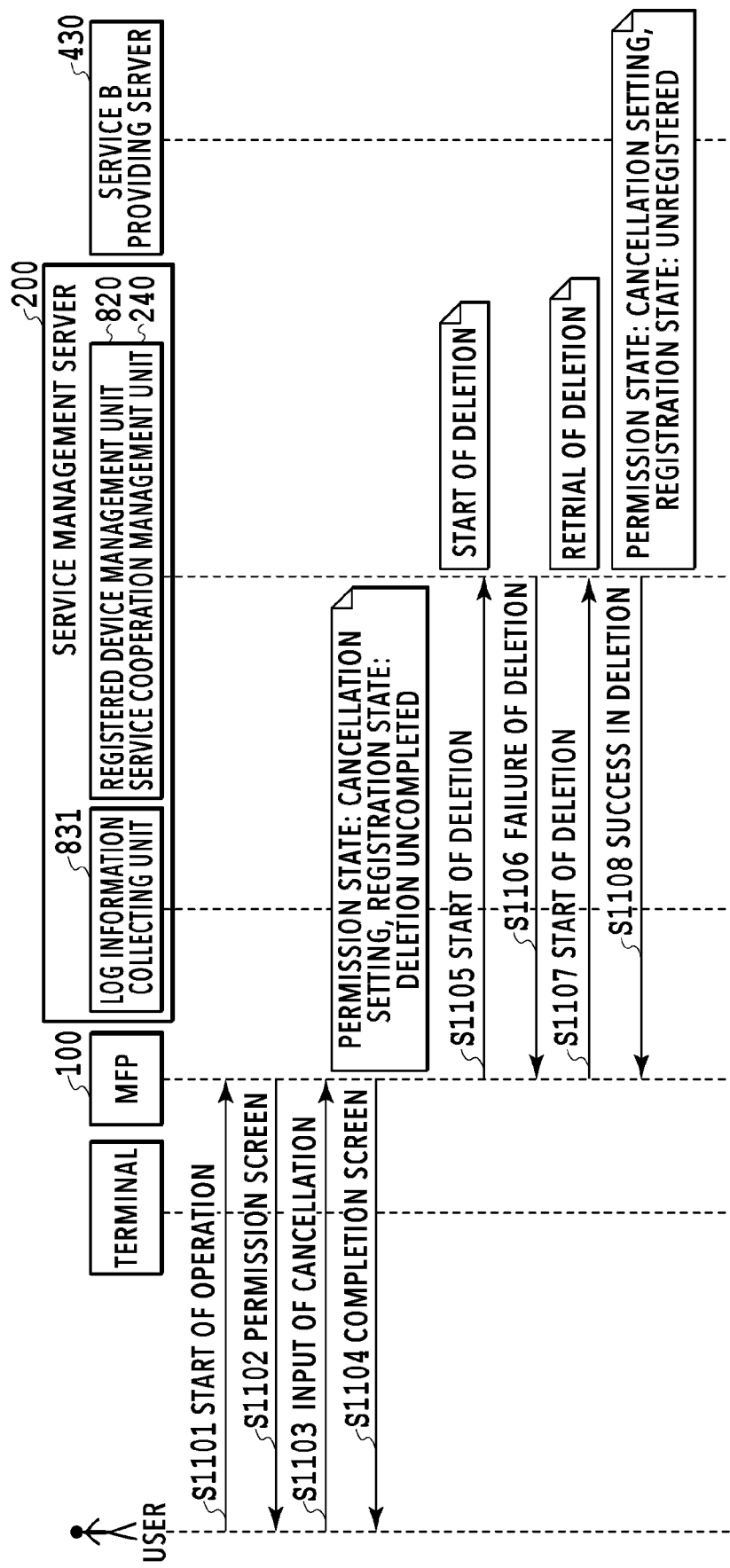
FIG. 11 is a sequence diagram of deleting registration of the MFP from the service management server.

FIG. 11 is a sequence diagram in a case where the user changes the permission state and the common permission setting is canceled. In S1101, the MFP 100 receives a start of the permission cancellation operation from the user. In S1102, the MFP 100 displays a permission screen on the operation display unit 108. In S1103, the MFP 100 receives an input of permission cancellation from the user. As a result, the state of the MFP 100 becomes "permission state: cancellation setting" and "registration state: deletion uncompleted". In S1104, the MFP 100 displays a completion screen on the operation display unit 108. The user recognizes completion of the cancellation.

As explained above, transmission of log information and status information is performed on the condition that at least "permission state: permission setting" is set. Therefore, since the "permission state: cancellation setting" is set, the MFP 100 neither transmits log information nor status information. Note that, in order to prevent a mismatch with the service management server 200, processing of deleting a registration state with the service management server 200 is performed in the following steps.

In S1105, the MFP 100 transmits a registration deletion request to the service management server 200. In the example of FIG. 11, the registration cannot be deleted in the stage of S1105 due to some reason, and a response of deletion failure is transmitted from the service management server 200 to the MFP 100 in S1106. The MFP 100 keeps retrying until the deletion is successfully performed. In S1107, the MFP 100 transmits a registration deletion request to the service management server 200 again. In a case where deletion is successfully performed, the service management server 200 transmits a notification that the deletion is successfully performed to the MFP 100 in S1108. Upon receiving the notification that the deletion is successfully performed, the state of the MFP 100 becomes "permission state: cancellation setting" and "registration state: unregistered". Note that, subsequently, in a case where the common permission setting is input again by the user, the registration process is performed again, returning back to the processing illustrated in FIG. 9. Further, in a case where the state is changed to "permission state: permission setting" again during a retrial of deletion, the MFP 100 performs registration processing again after the registration deletion is successfully performed.

Note that FIG. 11 is a sequence diagram illustrating deletion processing in a case of canceling a common permission setting. In such a case, as illustrated in S1107, a retrial of deletion is kept performed until the deletion is completed in the service management server 200. This is to prevent a mismatch with the service management server 200. However, in a case of resetting to the initial state (or a predetermined state) such as initialization processing for the entire MFP 100, the entire apparatus enters in reset processing, and therefore retrial processing in response to a failure of registration cancellation is not performed.

As described above, in the present embodiment, in a case where the user inputs an instruction to set common permission state information to the permission setting, the MFP 100 starts log transmission. Further, in a case where a notification from the service management server 200 includes information indicating that transmission of status information is "allowed", the MFP 100 starts transmission of status information to be used in a service. Further, in a case where the permission state information is changed to a value indicative of the cancellation setting, the MFP 100 stops log transmission and status transmission and starts deletion processing with the registered device management unit 820 of the service management server 200. Then, a retrial of deletion is kept performed until the deletion is completed.

As explained above, in the present embodiment, the MFP 100 does not manage utilization permission for transmitting device information on a per service basis but manages utilization permission as common permission state information. Therefore, the user only needs to input the common permission setting once as a permission procedure for providing information to the outside, and, in a case of receiving provision of another service, the procedure for the permission setting is not necessary any more. Therefore, convenience for users in a case of adding a service is improved.

Further, in the present embodiment, it is possible that the MFP 100 transmits suitable data according to the situation of service utilization registration. That is, a common permission setting is provided for each service, and, in a case where the permission setting is set, log information is transmitted. Further, status information is transmitted in accordance with whether transmission of status information is allowed or not, which is notified by the service management server 200. As described above, by controlling information to be transmitted in two stages, it is possible to prevent transmission of unnecessary information.

Other Embodiments

Although the MFP 100 is taken as an example of an electronic device in the explanation of the above-described embodiments, the present invention is not limited thereto. Any electronic device may be used as long as the electronic device regularly or irregularly transmits a usage state or a usage history, etc., of the electronic device used by the user to a server. Alternatively, any electronic device may be used as long as the electronic device regularly or irregularly transmits status information of the electronic device to the server. Although a relatively large device such as the MFP 100 is taken as an example in the explanation of the above-described embodiments, an electronic device (for example, glasses, a watch, etc.) worn by a human may be used. Furthermore, the electronic device may be a sensor installed at a predetermined place. Further, other household appliances (for example, a refrigerator, a light, a television, a vacuum cleaner, a home speaker) may be used. Moreover, the electronic device may be mounted on various kinds of vehicles such as a car, a train, a plane, and an unmanned aircraft.

Furthermore, although the service management server 200 is configured of one information processing apparatus in the embodiments described above, the present invention is not limited thereto. For example, multiple information processing apparatuses may cooperate with each other to function as the service management server 200. Although each of the service providing servers 420, 430, and 440 is also configured of one information processing apparatus in the embodiments described above, the present invention is not limited thereto. Each service providing server may be configured of multiple information processing apparatuses.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-145426, filed Aug. 1, 2018, and No. 2018-145428, filed Aug. 1, 2018, which are hereby incorporated by reference wherein in their entirety.

What is claimed is:

1. An electronic device capable of communicating with a management server through an internet, the management server being capable of communicating with a plurality of service providing servers including a first service providing server and a second service providing server, the electronic device comprising:
   at least one processor for causing the electronic to device to function as:
     a communication unit configured to connect the electronic device to the internet;
     a management unit configured to control a permission setting state where transmission of information via the internet from the electronic device is permitted by a user and a non-permission setting state where transmission of the information via the internet from the electronic device is not permitted by the user; and
     a processing unit configured to perform a process for transmitting the information to the management server in a state where the electronic device is being connected to the internet by the communication unit, in a case where the electronic device is in the permission setting state,
   wherein the management unit is able to change a state of the electronic device from the non-permission setting state to the permission setting state based on a user instruction, even in a state where the electronic device is not being connected to the internet, and
   wherein, in the case where the electronic device is in the permission setting state, the processing unit transmits, as the information, first information necessary for a first service provided by the first service providing server and second information necessary for a second service provided by the second service providing server and not necessary for the first service.

2. The electronic device according to claim 1, wherein the processing unit is configured to
   execute registration processing for registering the electronic device in the management server, and
   regularly or irregularly transmit the information to the management server after the registration processing is completed.

3. The electronic device according to claim 1, wherein the at least one processor further causes the electronic device to function as:
   a notification unit configured to output a notification for inquiring of the user whether to permit the transmission of the information, before the user utilizes the first service, and
   wherein, in a case where the transmission of information is permitted by the user through the notification, the notification unit does not output the notification before the user utilizes the second service.

4. The electronic device according to claim 1, wherein the information transmitted by the processing unit includes information necessary for any of the respective services.

5. The electronic device according to claim 1, wherein the information transmitted by the processing unit includes at least one of an error occurrence situation, the number of times of printing, the number of printed sheets, a remaining amount of consumables, or identification information of consumables.

6. An information processing system including an electronic device and a management server capable of communicating with a plurality of service providing servers including a first service providing server and a second service providing server, the system comprising:
   the electronic device comprising:
   at least one processor for causing the electronic device to function as:
     a communication unit configured to connect the electronic device to an internet;
     a management unit configured to control a permission setting state where transmission of information via the internet from the electronic device is permitted by a user and a non-permission setting state where transmission of the information via the internet from the electronic device is not permitted by the user; and
     a processing unit configured to perform a process for transmitting the information to the management server in a state where the electronic device is being connected to the internet by the communication unit, in a case where the electronic device is in the permission setting state, wherein, the management unit is able to change a state of the electronic device from the non-permission setting state to the permission setting state based on a user instruction, even in a state where the electronic device is not being connected to the internet, and wherein, in the case where the electronic device is in the permission setting state, the processing unit transmits, as the information, first information necessary for a first service provided by the first service providing server and second information necessary for a second service provided by the second service providing server and not necessary for the first service; and the management server comprising:

at least one processor for causing the management server to function as:

a transferring unit configured to transfer the first information to the first service providing server and transfer the second information to the second service providing server.

7. The information processing system according to claim 6, wherein, in a case where the first service providing server does not require the user to perform registration for utilizing the first service, the management server is configured to regularly or irregularly transfer the first information to the first service providing server without receiving a notification from the first service providing server.

8. The information processing system according to claim 6, wherein, in a case where the second service providing server requires the user to perform registration for utilizing the second service, the management server is configured to receive a notification of completion of the registration from the second service providing server and then regularly or irregularly transfer the second information to the second service providing server.

9. The information processing system according to claim 6, wherein, in a case where the plurality of service providing servers include a third service providing server that requires the user to perform registration for utilizing a third service, which is the service provided by the third service providing server, the management server is configured to transfer third information necessary for the third service to the third service providing server on a condition that the management server receives a request from the third service providing server for which the registration is completed.

10. The information processing system according to claim 8, wherein the second service providing server starts providing the second service on a condition that the registration of the electronic device in the service providing server is completed.

11. The electronic device according to claim 1, wherein the at least one processor further causes the electronic device to function as:

a first transmission unit configured to regularly or irregularly transmit the first information to the management server in the case were the electronic device is in the permission setting state; and a second transmission unit configured to regularly or irregularly transmit the second information to the management server in the case where the electronic device is in the permission setting state and a notification indicating that transmission of information is allowed has been received from the management server.

12. The electronic device according to claim 11, wherein the notification is received as a response to a registration request for registering the electronic device in the management server.

13. The electronic device according to claim 11, wherein the notification is received as a response to an inquiry from the electronic device to the management server whether the transmission of information is allowed or not.

14. The electronic device according to claim 11, wherein the management server is configured to be capable of transmitting at least a part of the second information to the second service providing server, and wherein the notification is transmitted from the management server in a case where the management server has detected that the electronic device corresponds to a device registered for utilizing the service.

15. The electronic device according to claim 14, wherein the second information corresponds to information applicable to all the services provided by the plurality of service providing servers.

16. The electronic device according to claim 11, wherein the first information corresponds to log information, which is indicative of a log of the electronic device, and the second information corresponds to status information, which is indicative of a state of the electronic device.

17. The electronic device according to claim 11, wherein the first transmission unit and the second transmission unit are configured to stop transmitting the first information and the second information to the management server in a case where the electronic device is changed to a permission cancellation state where the permission setting state is cancelled.

18. The electronic device according to claim 11, wherein the at least one processor further causes the electronic device to function as a third transmission unit configured to transmit a deletion request for deleting registration to the management server in a case where the electronic device is changed to a permission cancellation state where the permission setting state is cancelled.

19. The electronic device according to claim 18, wherein, in a case where the electronic device is changed to the permission setting state before the deletion of the registration is completed in response to the deletion request, a request for registering the electronic device in the management server is transmitted after the deletion of the registration is completed.

20. A control method of an electronic device capable of communicating with a management server through an internet, the management server being capable of communicating with a plurality of service providing servers including a first service providing server and a second service providing server, the control method comprising:

controlling a permission setting state where transmission of information via the internet from the electronic device is permitted by a user and a non-permission setting state where transmission of the information via the internet from the electronic device is not permitted by the user; and performing a process for transmitting the information to the management server in a state where the electronic device is being connected to the internet, in a case where the electronic device is in the permission setting, wherein a state of the electronic device is able to be changed from the non-permission setting state to the permission setting state based on a user instruction, even in a state where the electronic device is not being connected to the internet, and wherein, in the case where the electronic device is in the permission setting state, the performing includes transmitting, as the information, first information necessary for a first service provided by the first service providing server and second information necessary for a second service provided by the second service providing server and not necessary for the first service.

21. The electronic device according to claim 1, wherein, in the case where the electronic device is in the permission setting state, the processing unit transmits, as the information, the first information and the second information, even before the electronic device has been registered in the second service providing server.

22. The information processing system according to claim 6,
   wherein, in the case where the electronic device is in the permission setting state, the processing unit transmits, as the information, the first information and the second information, even before the electronic device has been registered in the second service providing server, and
   wherein the management server does not transfer the second information to the second service providing server until the electronic device is registered in the second service providing server.

* * * * *